(12) United States Patent
Lee et al.

(10) Patent No.: US 11,361,718 B2
(45) Date of Patent: Jun. 14, 2022

(54) IMAGE DATA PROCESSING APPARATUS AND METHOD FOR IMPLEMENTING LOCAL DIMMING

(71) Applicant: SILICON WORKS CO., LTD., Daejeon (KR)

(72) Inventors: Ji Won Lee, Daejeon (KR); Jung Eun Baek, Daejeon (KR); Xin Cui, Daejeon (KR); Do Hoon Lee, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/122,344

(22) Filed: Dec. 15, 2020

(65) Prior Publication Data

US 2021/0193058 A1    Jun. 24, 2021

(30) Foreign Application Priority Data

Dec. 19, 2019    (KR) .......................... 10-2019-0170329

(51) Int. Cl.
 *G09G 3/34*     (2006.01)
 *G06T 7/11*     (2017.01)
(52) U.S. Cl.
 CPC .............. *G09G 3/3406* (2013.01); *G06T 7/11* (2017.01); *G06T 2207/10016* (2013.01);
 (Continued)
(58) Field of Classification Search
 CPC ......... G09G 3/3406; G09G 2320/0633; G09G 2360/145; G09G 2360/16; G09G 3/3426; G09G 2320/0626; G09G 2320/0233; G09G 2330/021; G06T 7/11; G06T 2207/10016; G06T 2207/20021
 See application file for complete search history.

(56) References Cited

U.S. PATENT DOCUMENTS

| 7,505,016 B2 * | 3/2009 | Kwon | ................. | G09G 3/3426 345/87 |
| 8,334,834 B2 * | 12/2012 | Chen | .................... | G09G 3/3406 345/102 |

(Continued)

FOREIGN PATENT DOCUMENTS

| KR | 10-1319352 B1 | 10/2013 |
| KR | 10-2018-0074407 A | 7/2018 |

*Primary Examiner* — Vijay Shankar
(74) *Attorney, Agent, or Firm* — Fenwick & West LLP

(57) ABSTRACT

An image processing device reduces power consumption of a backlight by lowering a dimming value through brightness distribution for pixels. The image data processing device includes: an image analyzing circuit configured to analyze original image data on a video image divided into a plurality of regions and calculate a representative brightness value for each region; a dimming value calculating circuit configured to calculate a dimming value for each region in order to adjust the brightness of a backlight according to the representative brightness value; a pixel analyzing circuit configured to analyze brightness distribution for a plurality of pixels in each region; a dimming control circuit configured to re-adjust the dimming value for one region according to the brightness distribution; and a dimming output circuit configured to output, to a backlight driving device, a dimming control signal for driving the backlight according to the dimming value.

12 Claims, 6 Drawing Sheets

(52) U.S. Cl.
CPC ............. *G06T 2207/20021* (2013.01); *G09G 2320/0633* (2013.01); *G09G 2360/145* (2013.01)

(56) References Cited

U.S. PATENT DOCUMENTS

| | | | |
|---|---|---|---|
| 8,659,535 B2 * | 2/2014 | Hwang | ................ G09G 3/3406 345/102 |
| 9,892,690 B2 * | 2/2018 | Zuo | ..................... G09G 3/3406 |
| 10,692,443 B2 * | 6/2020 | Wu | ........................ H03K 7/08 |
| 10,777,147 B2 * | 9/2020 | Wu | ........................ G09G 3/20 |
| 2019/0206335 A1 | 7/2019 | Wu | |
| 2021/0335288 A1 * | 10/2021 | Jeon | ..................... G09G 3/3406 |

* cited by examiner

IMAGE DATA PROCESSING APPARATUS AND METHOD FOR IMPLEMENTING LOCAL DIMMING

CROSS REFERENCE TO RELATED APPLICATION

This application claims priority from Republic of Korea Patent Application No. 10-2019-0170329, filed on Dec. 19, 2019, which is hereby incorporated by reference in its entirety.

BACKGROUND

1. Field of Technology

The present embodiment relates to a display technology for reducing power consumption of a backlight.

2. Description of the Prior Art

Among various components constituting an electronic device, the component having the highest power consumption is a display device. The display device remains in the state of being turned on during the time of providing information to a user, and continues to emit light during the time for which the display device is turned on, which results in higher power consumption in the display device than in other components of the electronic device.

For this reason, manufacturers of electronic devices have continuously conducted research and development to reduce the power consumption of display devices. Typical examples thereof are techniques for switching the display device to a standby mode or turning on only a portion of a display panel.

However, since these techniques are intended to reduce power consumption of a display device by actually constraining a user environment to a certain degree, they inevitably cause some inconvenience to users.

Meanwhile, a technique capable of reducing power consumption of a display device without changing a user environment or while providing a user environment involving little change that is negligible to the user is under development, and a typical example thereof is a local dimming technology.

Local dimming is a technique for partially driving the backlight at different brightness. According to local dimming, a display panel may be divided into several regions, and a plurality of backlight units (BLUs) may emit light to the divided regions at different brightness. Here, the great difference in brightness of the backlight unit emitting light to the respective regions may cause artifacts.

Filtering is performed during image processing in order to remove the artifacts, but the brightness of the backlight unit may increase during the filtering. In particular, in the case where the brightness of the peripheral backlight unit is high, the brightness of the backlight unit may also increase. As the brightness of the backlight unit increases, power consumption may also increase.

Although the power consumption of the backlight unit is reduced compared to the state before applying local dimming, it becomes somewhat higher as the filtering is performed, so a more efficient reduction in the power consumption may fail.

SUMMARY

In this regard, the present embodiment is to provide a local dimming technique for efficiently reducing power consumption.

An objective of the present embodiment is to provide a technique for controlling a dimming value to be low through brightness distribution for pixels.

Another objective of the present embodiment is to provide a technique for reflecting the fact that an actual change in the brightness of a pixel according to a change in a dimming value differs depending on a pixel level to a gain for changing a grayscale value of image data according to a dimming value.

In order to attain the objectives described above, an embodiment provides an image data processing device that includes: an image analyzing circuit configured to analyze original image data on a video image divided into a plurality of regions and calculate a representative brightness value for each region; a dimming value calculating circuit configured to calculate a dimming value for each region in order to adjust the brightness of a backlight according to the representative brightness value; a pixel analyzing circuit configured to analyze brightness distribution for a plurality of pixels in each region; a dimming control circuit configured to re-adjust the dimming value for one region according to the brightness distribution; and a dimming output circuit configured to output, to a backlight driving device, a dimming control signal for driving the backlight according to the dimming value.

In the image data processing device, the pixel analyzing circuit may analyze distribution of grayscale values for a plurality of pixels in each region, and the dimming control circuit may adjust the amount of reduction in a dimming value in the one region so as to correspond to a degree in which the grayscale value indicates low brightness.

The image data processing device may further include: a gain calculating circuit configured to calculate a gain for compensating for the original image data according to the dimming value; and a data converting circuit configured to generate image data converted from original image data for one pixel in the one region using the gain.

The image data processing device may further include a gain compensation circuit configured to calculate a first compensation gain for compensating for a difference of a rate of reduction in the brightness of the one pixel with respect to a rate of reduction in the dimming value due to the re-adjustment by the dimming control circuit.

In the image data processing device, the difference and the first compensation gain may vary depending on a pixel level including a grayscale value of the original image data.

In the image data processing device, the gain compensation circuit may use a look-up table (LUT) configured as the pixel levels and the first compensation gains corresponding to the pixel levels.

In the image data processing device, the gain compensation circuit may calculate first compensation gains for some of the pixel levels, and may interpolate the first compensation gains for some of the pixel levels to calculate first compensation gains for the remaining pixel levels.

In the image data processing device, the gain compensation circuit may calculate a second compensation gain for compensating for a difference in brightness depending on the position and distance of the one pixel or the backlight.

In the image data processing device, the data converting circuit may generate the converted image data using a gain reflecting the first compensation gain or the second compensation gain.

The image data processing device may further include a filtering circuit configured to adjust the dimming value through filtering such that a difference in the dimming value between the regions and a difference in the dimming value between the frames are reduced.

Another embodiment provides a method for processing image data, which includes the steps of: analyzing original image data on a video image divided into a plurality of regions to calculate a representative brightness value for each region; calculating a dimming value for each region in order to adjust the brightness of a backlight according to the representative brightness value; adjusting the dimming value through spatial filtering such that a difference in the dimming value between the regions is reduced; analyzing brightness distribution for a plurality of pixels in each region; re-adjusting the dimming value for one region according to the brightness distribution; calculating a gain for compensating for the original image data according to the dimming value; and generating image data converted from original image data for one pixel in the one region using the gain.

The step of re-adjusting the dimming value may be performed after the step of adjusting the dimming value through the spatial filtering, and if the one region has a low brightness distribution, the dimming value of the one region may be reduced in order to lower the brightness of the backlight for the one region.

The method for processing image data may further include a step of adjusting the dimming value through temporal filtering such that a difference in the dimming value between frames is reduced.

The step of adjusting the dimming value through spatial filtering may include a step of, if there is a difference in the dimming value between two regions, increasing a dimming value in the region having a low dimming value so as to reduce the difference between the two regions.

The step of analyzing brightness distribution may include a step of analyzing brightness distribution of each region using cumulated density function (CDF) data on grayscale values of the plurality of pixels As described above, according to the present embodiment, it is possible to reduce power consumption of a backlight unit through a low dimming value and a gain compensating for the same.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
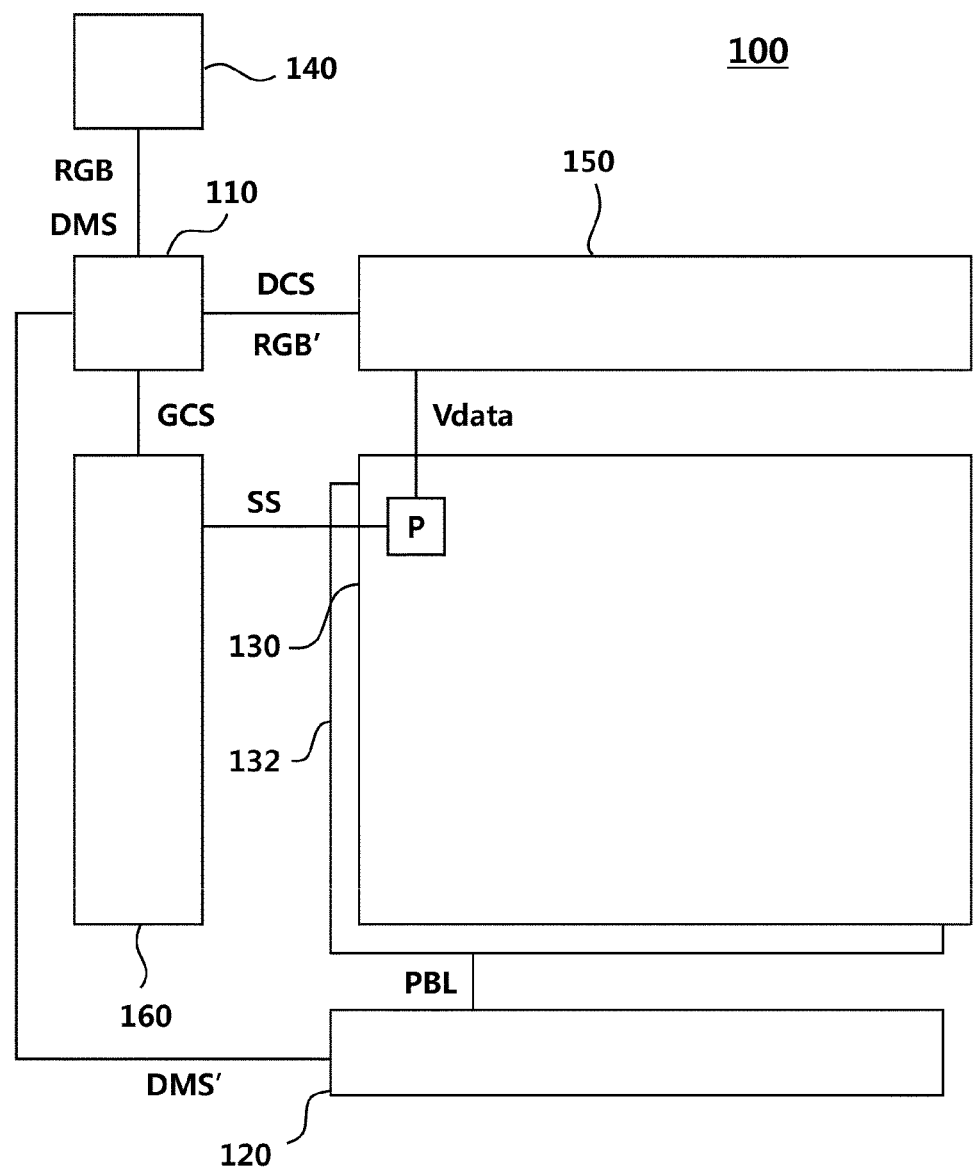
FIG. 1 is a block diagram of a display device according to an embodiment.

FIG. 1 is a block diagram of a display device according to an embodiment.

Referring to FIG. 1, a display device 100 may include a host 140, an image data processing device 110, a data driving device 150, a gate driving device 160, a display panel 130, a backlight driving device 120, and the like.

The host 140 may recognize user manipulations, and may generate image data or a dimming control signal according to the user manipulations.

Image data may be converted into various forms in the display device 100. Hereinafter, the image data generated and transmitted by the host 140 will be referred to as "original image data" RGB (red, green, and blue) in order to distinguish the same from the converted image data below, and the image data generated and transmitted by the image data processing device 110 will be referred to as "converted image data" RGB'. In addition, a dimming value included in the dimming control signal may be adjusted in the display device 100. Hereinafter, the dimming control signal generated and transmitted by the host 140 will be referred to as an "unadjusted dimming control signal" DMS (dimming signal) in order to distinguish the same from the adjusted dimming control signal below, and the dimming control signal generated and transmitted by the image data processing device 110 will be referred to as an "adjusted dimming control signal" DMS'.

Referring to the flow of signals, image data is generated by the host 140, is converted by the image data processing device 110, and is then transmitted to the data driving device 150. In addition, the dimming control signal is generated by the host 140, is adjusted by the image data processing device 110, and is then transmitted to the backlight driving device 120.

The image data processing device 110 converts image data and adjusts a dimming control signal.

The image data processing device 110 may analyze original image data RGB for a plurality of pixels P arranged in the display panel 130, and may calculate a representative brightness value for the plurality of pixels P. Since the plurality of pixels P has different brightness values from each other, the image data processing device 110 calculates a representative brightness value that represents the plurality of pixels P. The representative brightness value may be, for example, an average brightness value for the plurality of pixels P. Alternatively, the representative brightness value may be, for example, the brightness value that most frequently appears in the plurality of pixels P, or may be the maximum brightness value thereof. The image data processing device 110 may calculate a representative brightness value for the plurality of pixels P using a CDF (cumulated density function) algorithm or an APL (average pixel level) algorithm. The representative brightness value may include a value for the CDF or the APL.

The image data processing device 110 may calculate an adjusted dimming value for driving a backlight 132 according to the representative brightness value or the representative brightness value modified according to a specific configuration. Here, a dimming value may be understood as a dimming brightness value. The higher the dimming value, the higher the brightness value of the backlight 132. For example, if the dimming value is 100%, the backlight 132 may be driven at the maximum brightness, and if the dimming value is 0%, the backlight 132 may be driven at the minimum brightness, or may be turned off.

The image data processing device 110 may reduce the adjusted dimming value of the backlight 132 as the representative brightness value is reduced. In other words, the image data processing device 110 may reduce the brightness of the backlight 132 as the representative brightness value is reduced.

The image data processing device 110 may convert the original image data RGB in order to compensate for a greyscale value of each pixel according to the adjusted dimming value. The image data processing device 110 may calculate a factor called "gain", may convert the original image data RGB using the gain, and may compensate for the greyscale value. Although the brightness (or illuminance) of the pixel may vary with the adjustment of the dimming value, if the greyscale value displayed by the pixel is adjusted according to the gain so as to correspond to the adjusted dimming value, the pixel may maintain the original brightness. For example, the image data processing device 110 may convert the original image data RGB such that the greyscale value of each pixel is increased as the adjusted dimming value is reduced. Accordingly, the brightness of each pixel may remain the same. Here, the gain may have a characteristic of increasing the greyscale value. A rate of reduction in the dimming value and a rate of increase in the greyscale value of the pixel may be different from each other, and may differ depending on a pixel level.

The image data processing device 110 may generate an adjusted dimming control signal DMS' according to the adjusted dimming value, and may output the adjusted dimming control signal DMS' to the backlight driving device 120.

Meanwhile, a plurality of pixels P may be arranged in the display panel 130, and data lines and gate lines connected to the plurality of pixels P may be arranged therein. The gate driving device 160 may transmit scan signals SS to the gate lines, thereby connecting the respective pixels P to the data lines, and the data driving device 150 may supply a data voltage Vdata corresponding to the image data to the data lines, thereby driving the respective pixels P.

The image data processing device 110 may transmit a gate control signal GCS to the gate driving device 160, and may transmit a data control signal DCS to the data driving device 150, thereby controlling driving timings for the respective pixels P. In this respect, the gate driving device 160 may be referred to as a "gate driver IC (GDIC)", the data driving device 150 may be referred to as a "source driver IC (SDIC)", and the image data processing device 110 may be referred to as a "timing controller (TCON)".

The backlight 132 may be disposed in the background of the display panel 130, and the backlight 132 may be driven by the backlight driving device 120.

The backlight driving device 120 may control the brightness of light sources constituting the backlight 132. The light sources may be provided by, for example, a fluorescent lamp (FL) type or a light-emitting diode (LED) type.

The backlight driving device 120 may control dimming of the backlight 132. For example, the backlight driving device 120 may control the dimming of the backlight 132 using an analog dimming scheme for reducing the amount of power PBL supplied to the backlight 132 while continuously driving the backlight 132. As another example, the backlight driving device 120 may control the dimming of the backlight 132 using a pulse width modulation (PWM) scheme for adjusting the ratio of a turn-on time to a turn-off time while discontinuously driving the backlight 132. According to an embodiment, the PWM scheme may be a method of controlling the brightness of the backlight using the magnitude of voltage charged to a capacitor or the like by a PWM signal. The adjustment of a dimming value may be understood as adjustment of a PWM signal duty in the PWM scheme.

In the analog dimming scheme, the dimming control signal DMS or DMS' may be implemented in the form of an analog voltage or an analog current, and in the PWM scheme, the dimming control signal DMS or DMS' may be implemented in the form of a PWM signal.

Figure 2:
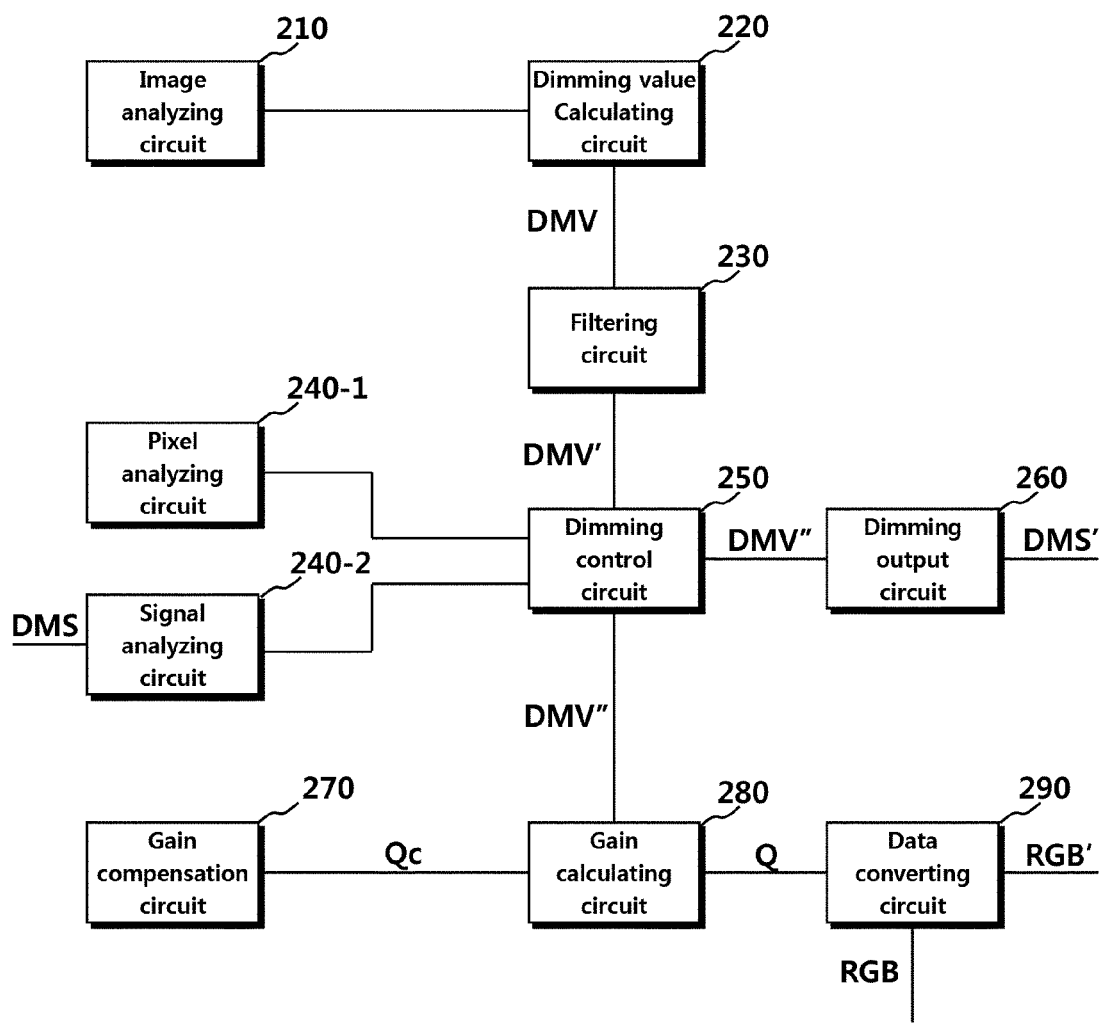
FIG. 2 is a block diagram of an image data processing device according to an embodiment.

FIG. 2 is a block diagram of an image data processing device according to an embodiment.

Referring to FIG. 2, the image data processing device 110 may include an image analyzing circuit 210, a dimming value calculating circuit 220, a filtering circuit 230, a pixel analyzing circuit 240-1, a signal analyzing circuit 240-2, a dimming control circuit 250, a dimming output circuit 260, a gain compensation circuit 270, a gain calculating circuit 280, and a data converting circuit 290.

The image analyzing circuit 210 may receive a video image including a plurality of regions including a plurality of pixels. The backlight 132 may adjust dimming such that the respective regions of the video image have different dimming values.

The image analyzing circuit 210 may analyze original image data RGB on the video image, thereby calculating a representative brightness value for each region. The image analyzing circuit 210 may calculate a representative brightness value for original R-image data, original G-image data, and original B-image data in order to generate an appropriate dimming value for local dimming. The representative brightness value may include an average pixel level (APL). The representative brightness value may include an average value, a median value, or a value obtained through a histogram or pooling.

For example, the image analyzing circuit 210 may use the greatest value among the original R-image data, the original G-image data, and the original B-image data as the representative brightness value. Alternatively, the image analyzing circuit 210 may use, as the representative brightness value, the value obtained by applying an appropriate weight to the original R-image data, the original G-image data, and the original B-image data and summing the same. Alternatively, the image analyzing circuit 210 may use the value in which the original image data RGB is mapped to a specific curve as the representative brightness value.

The dimming value calculating circuit 220 may calculate a dimming value. The dimming value calculating circuit 220 may calculate an initial dimming value DMV for each region according to the representative brightness value. The dimming value calculating circuit 220 may calculate an initial dimming value DMV for the representative brightness value using a logarithmic function, an exponential function, or a user function.

The filtering circuit 230 may filter a dimming value. The filtering circuit 230 may generate a filtered dimming value DMV' by adjusting the initial dimming value DMV through filtering. The filtering circuit 230 may perform spatial filtering. The initial dimming value DMV differs between a plurality of regions of the video image, which causes a difference, so the filtering circuit 230 may adjust the difference. Usually, if the initial dimming value DMV in one region is smaller than the initial dimming values DMV in neighboring regions, the filtering circuit 230 may increase the initial dimming value DMV of the one region, thereby reducing the difference therebetween. Alternatively, if the initial dimming value DMV in one region is greater than the initial dimming values DMV in neighboring regions, the filtering circuit 230 may reduce the initial dimming value DMV of the one region, thereby reducing the difference therebetween. Accordingly, the filtering circuit 230 may prevent the artifacts caused by the difference.

The filtering circuit 230 may use a weighted sum in order to adjust the dimming value. The filtering circuit 230 may receive the weighted sum as feedback, and may generate a new weighted sum, thereby performing a stable filtering operation.

In addition, the filtering circuit 230 may perform temporal filtering. The filtering circuit 230 may adjust the difference in the dimming value between frames through the temporal filtering. The dimming value may vary between a current frame and a subsequent frame, and the filtering circuit 230 may reduce the difference in the dimming value between the current frame and the subsequent frame. The filtering circuit 230 may prevent flickering that occurs when the difference in the dimming value increases between the frames.

The pixel analyzing circuit 240-1 may analyze brightness distribution for a plurality of pixels in each region. The pixel analyzing circuit 240-1 may determine whether or not the brightness distribution for pixels in each region is weighted toward low brightness. The pixel analyzing circuit 240-1 may transmit a result of analyzing the brightness distribution for pixels to the dimming control circuit 250. The result of analyzing the brightness distribution for pixels may be reflected in adjustment of the dimming value. For example, if the brightness distribution of pixels is weighted toward low brightness in one region, the dimming control circuit 250 may adjust the filtered dimming value DMV' to be low.

The pixel analyzing circuit 240-1 may use a histogram in order to analyze the brightness distribution for pixels. The pixel analyzing circuit 240-1 may compare the number of low-brightness pixels with the number of high-brightness pixels from the histogram result. Alternatively, the pixel analyzing circuit 240-1 may receive, as feedback, the representative brightness value calculated by the image analyzing circuit 210, and may use the representative brightness value to determine the brightness distribution for pixels.

The signal analyzing circuit 240-2 may analyze an input signal used as a dimming control signal. For example, the dimming control signal may be implemented in the form of a PWM signal, and the backlight may be driven to correspond to the ratio of a turn-on time of the PWM signal. Here, the PWM signal may correspond to an input dimming control signal DMS analyzed by the signal analyzing circuit 240-2. The signal analyzing circuit 240-2 may analyze the characteristics of a PWM signal (e.g., a frequency, a cycle, a level, or a duty). The signal analyzing circuit 240-2 may transmit a result of analyzing the input dimming control signal DMS to the dimming control circuit 250. The result of analyzing the input dimming control signal DMS may be reflected in the adjustment of a dimming value.

The dimming control circuit 250 may finally determine a dimming value. The dimming control circuit 250 may reflect the result of analyzing the brightness distribution for pixels and the result of analyzing the input dimming control signal DMS to the filtered dimming value DMV'.

If the brightness distribution for pixels in one region is weighted toward low brightness, the dimming control circuit 250 may reduce the dimming value of the one region in order to reduce the brightness of the backlight in the one region. For example, the dimming control circuit 250 may calculate an adjusted dimming value DMV" by reflecting the result of the brightness distribution to the filtered dimming value DMV'. The dimming control circuit 250 may transmit the adjusted dimming value DMV" to the dimming output circuit 260.

The dimming control circuit 250 may change the dimming value. The dimming control circuit 250 may compare a dimming value with a target dimming value, and may gradually change a dimming value such that the dimming value reaches the target dimming value after a predetermined conversion time.

The dimming output circuit 260 may convert a dimming value into a dimming control signal, and may output the same to a backlight driving device. The dimming output circuit 260 may convert the adjusted dimming value DMV" into an adjusted dimming control signal DMS'. In one embodiment, the input dimming control signal DMS and the adjusted dimming control signal DMS' are of the same type. To this end, the dimming output circuit 260 must control the cycle or frequency of the adjusted dimming control signal DMS' so as to match the cycle or frequency of the input dimming control signal DMS.

The gain calculating circuit 280 may calculate a factor, that is, a gain Q, for compensating for the original image data RGB according to the dimming value. The brightness (or illuminance) of the pixel may vary with adjustment of the dimming value, and the gain Q may adjust the grayscale value of the pixel so as to correspond to the adjusted dimming value. Then, the pixel may maintain the original brightness regardless of the adjustment of a dimming value. In order to adjust the grayscale value displayed by the pixel, the gain Q may compensate for the original image data RGB, thereby producing converted image data RGB'. The pixel may display the adjusted grayscale value through the converted image data RGB'.

For example, the gain calculating circuit 280 may receive an adjusted dimming value DMV" from the dimming control circuit 250, and may calculate a gain according to the adjusted dimming value DMV". Here, the adjusted dimming value DMV" may be a dimming value generated by reflecting the brightness distribution to the filtered dimming value DMV'. Although the adjusted dimming value DMV" is lower than the initial dimming value DMV, the data converting circuit 290 may compensate for the original image data RGB through a gain Q, and may produce a converted image data RGB', and the pixel may output the grayscale value for the converted image data RGB'. Therefore, the pixel may have the same brightness as that before the dimming value is adjusted.

The gain compensation circuit 270 may compensate for the gain Q. The gain compensation circuit 270 may consider various situations in order to compensate for the gain Q.

In a first example, the gain compensation circuit 270 may compensate for the phenomenon in which a rate of change in a dimming value and a rate of change in the brightness of a pixel vary depending on a pixel level. Hereinafter, the pixel level may be understood as a concept including a grayscale value or brightness of image data for one pixel. In order to compensate for the difference in which an adjustment ratio of the brightness of a pixel with respect to an adjustment ratio of the adjusted dimming value DMV" varies depending on a pixel level, the gain compensation circuit 270 may calculate a compensation gain Qc. For example, the gain compensation circuit 270 may calculate a compensation gain Qc compensating for a difference between a rate of reduction in the brightness and a rate of reduction in the adjusted dimming value DMV". Since a rate of change in the dimming value and a rate of change in the brightness of a pixel vary depending on a pixel level, the compensation gain Qc may also vary depending on the pixel level.

For example, in a first pixel having a first pixel level, the ratio of a rate of reduction in the brightness of a pixel to a rate of reduction in the adjusted dimming value DMV" may be greater than 1, but in a second pixel having a second pixel level, the ratio of a rate of reduction in the brightness of a pixel to a rate of reduction in the adjusted dimming value DMV" may be less than 1. Accordingly, the compensation gain Qc for the first pixel level and the compensation gain Qc for the second pixel level may be different from each other.

The gain compensation circuit 270 may use a look-up table (LUT) or an equation in order to calculate the compensation gain Qc. The look-up table or the equation may reflect the actual situation in which the ratio of a rate of reduction in the brightness of a pixel to a rate of reduction in the adjusted dimming value DMV" varies. The look-up table may be configured as compensation gains Qc corresponding to all pixel levels. The gain compensation circuit 270 may retrieve a compensation gain Qc for one pixel level (e.g., a grayscale value) from the look-up table, and may transmit the same to the gain calculating circuit 280. In addition, the equation may reflect factors occurring in the processes of manufacturing the panel and measuring the brightness thereof. The gain compensation circuit 270 may calculate a compensation gain Qc using an equation.

In a second example, the gain compensation circuit 270 may compensate for the phenomenon in which the brightness of a pixel according to the dimming value varies depending on the position of the pixel and the distance to the backlight. The gain compensation circuit 270 may obtain information on the brightness of a pixel by using a Gaussian function or combining a 1's polynomial function, a 2's polynomial function, or the like according to a sampled point. The gain compensation circuit 270 may calculate a compensation gain Qc for compensating for the phenomenon in which the brightness of a pixel according to the dimming value DMV" varies depending on the position of the pixel and the distance to the backlight.

The gain calculating circuit 280 may finally determine a gain for compensating for the original image data RGB according to the adjusted dimming value DMV". The gain calculating circuit 280 may finally determine the gain Q by reflecting the compensation gain Qc calculated in the first example or the compensation gain Qc calculated in the second example.

The gain calculating circuit 280 may use an algorithm for finally determining a gain Q. If the original image data RGB is of a linear domain, the gain calculating circuit 280 may determine a gain Q using an equation of simply applying the gain Q. Alternatively, if the original image data RGB is of a non-linear domain, the gain calculating circuit 280 may determine a gain Q using an equation obtained by a combination of an equation of simply applying the gain Q and a gamma curve. In this process, if a gain Q in a high pixel level, which falls outside of an allowable range of the panel, is applied, the gain calculating circuit 280 may perform an operation of properly adjusting the gain Q and an operation of applying the same gain Q to the R channel, the G channel, and the B channel, respectively, thereby preventing deterioration.

The data converting circuit 290 may generate image data RGB' converted from the original image data RGB using the gain Q. The data converting circuit 290 may generate converted image data RGB' by applying the finally determined gain Q to the R-image data, the G-image data, and the B-image data.

Figure 3:
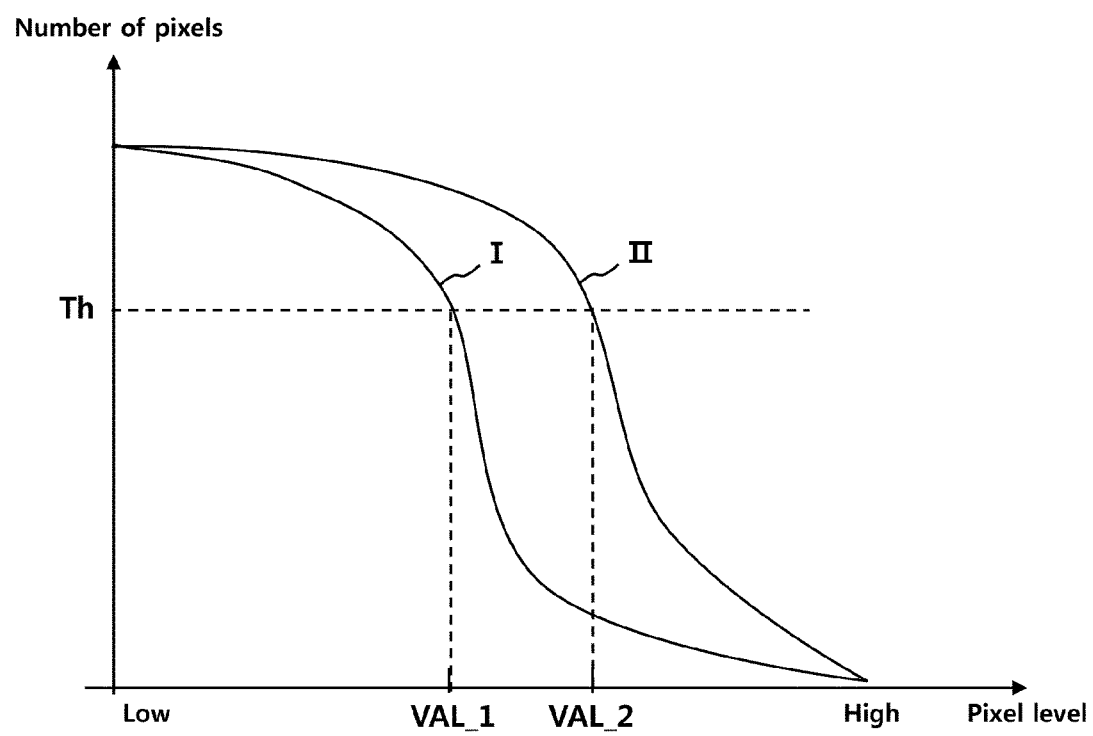
FIG. 3 is a diagram illustrating an example for explaining a reduction in a dimming value through analysis of brightness distribution of pixels according to an embodiment.

FIG. 3 is a diagram illustrating an example for explaining a reduction in dimming value through analysis of brightness distribution of pixels according to an embodiment.

Referring to FIG. 3, an example in which the pixel analyzing circuit 240-1 determines the amount of reduction in a dimming value through analysis of brightness distribution for pixels is illustrated.

The pixel analyzing circuit 240-1 may identify the brightness distribution for a plurality of regions of video image, and if the brightness distribution of one region corresponds to low brightness, may reduce the dimming value of the region, thereby reducing power consumption of the backlight.

The pixel analyzing circuit 240-1 may perform analysis of brightness distribution for pixels in one region, thereby obtaining a curve indicating the relationship between the number of pixels and pixel levels. Here, the number of pixels may be histogramed data or NCDF (normalized cumulated density function) data.

For example, if a first region has a low brightness distribution, and if a second region has a high brightness distribution, the brightness distribution of the first region may have a first curve I, and the brightness distribution of the second region may have a second curve II. The number of pixels of the brightness distribution curve may be expressed by accumulating high-level pixels to low-level pixels. On the horizontal axis indicating the pixel level, the pixel level may change from a low level to a high level as going from the left to the right. Since the first region includes a large number of low-brightness pixels, the first curve I may be biased toward the lower level. On the other hand, since the second region includes a large number of high-brightness pixels, the second curve II may be relatively biased toward a higher level compared to the first curve I.

In the case where a specific number of pixels is configured as a threshold value Th on the vertical axis indicating the number of pixels, the pixel analyzing circuit 240-1 may obtain pixel levels at the points where a threshold value Th meets the respective curves. The pixel analyzing circuit 240-1 may obtain a first pixel level VAL_1 that is a pixel level at the point in which the first curve I and the threshold value Th meet, and a second pixel level VAL_2 that is a pixel level at the point in which the second curve II and the threshold value Th meet. Since the pixel level changes from a lower level to a higher level as going from the left to the right on the horizontal axis indicating the pixel level, the first pixel level VAL_1 may be less than the second pixel level VAL_2.

In addition, the pixel analyzing circuit 240-1 may obtain the final size of the dimming value for reducing power consumption according to the pixel levels at the points where the threshold value Th and the respective curves meet. For example, the pixel analyzing circuit 240-1 may determine a larger amount of reduction in the dimming value as the pixel level is reduced, and may determine a smaller amount of reduction in the dimming value as the pixel level increases. Since the first pixel level VAL_1 is less than the second pixel level VAL_2, the pixel analyzing circuit 240-1 may determine a larger amount of reduction in the dimming value for the first pixel level VAL_1, may determine a smaller amount of reduction in the dimming value for the second pixel level VAL_2.

Figure 4:
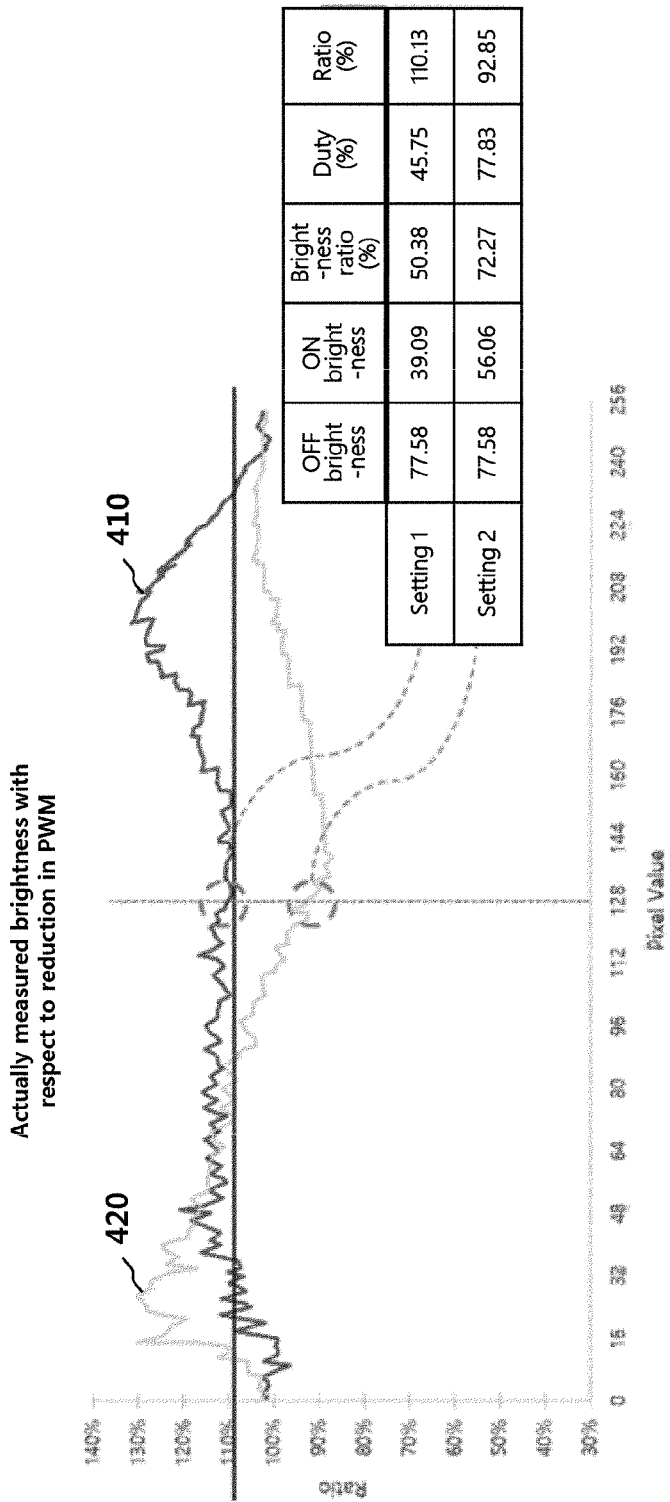
FIG. 4 is a diagram illustrating actual measurement of a reduction in brightness of a pixel in response to a reduction in a dimming value according to an embodiment.

FIG. 4 is a diagram illustrating actual measurement of a reduction in brightness of a pixel in response to a reduction in a dimming value according to an embodiment.

Referring to FIG. 4, actual measurement results showing that a rate of change in a dimming value and a rate of change in brightness of a pixel vary depending on a pixel level are illustrated. A reduction in the dimming value according to pixel levels from 0 to 255 and a reduction in the brightness of a pixel according thereto may be actually measured in two setting environments. FIG. 4 illustrates a first graph 410 showing the ratio of a rate of change in the brightness of a pixel to a rate of change in a dimming value depending on pixel levels from 0 to 255 in a first setting environment (setting 1), and a second graph 420 showing the ratio of a rate of change in the brightness of a pixel to a rate of change in a dimming value depending on pixel levels from 0 to 255 in a second setting environment (setting 2).

In the case of a pixel level of 128 in the first setting environment, if the initial brightness (OFF-brightness) is 77.58, if the later brightness (ON-brightness) is 39.09, and if a rate of change in a dimming value (Duty, %) is 45.75, the rate of change in the brightness (Brightness ratio, %) may be 50.38, and the ratio of the rate of change in the brightness (Ratio, %) to the rate of change in the dimming value may be 110.13.

Meanwhile, in the case of a pixel level of 128 in the second setting environment, if the initial brightness (OFF-brightness) is 77.58, if the later brightness (ON-brightness) is 56.06, and if a rate of change in a dimming value (Duty, %) is 77.83, the rate of change in the brightness (Brightness ratio, %) may be 72.27, and the ratio of the rate of change in the brightness (Ratio, %) to the rate of change in the dimming value may be 92.85.

Referring to the first and second graphs 410 and 420, it can be understood that the ratio of the rate of change in the brightness (Ratio, %) to the rate of change in the dimming value differs depending on the pixel level. In addition, the ratio of the rate of change in the brightness (Ratio, %) to the rate of change in the dimming value at the same pixel level may differ depending on the setting environment.

Figure 5:
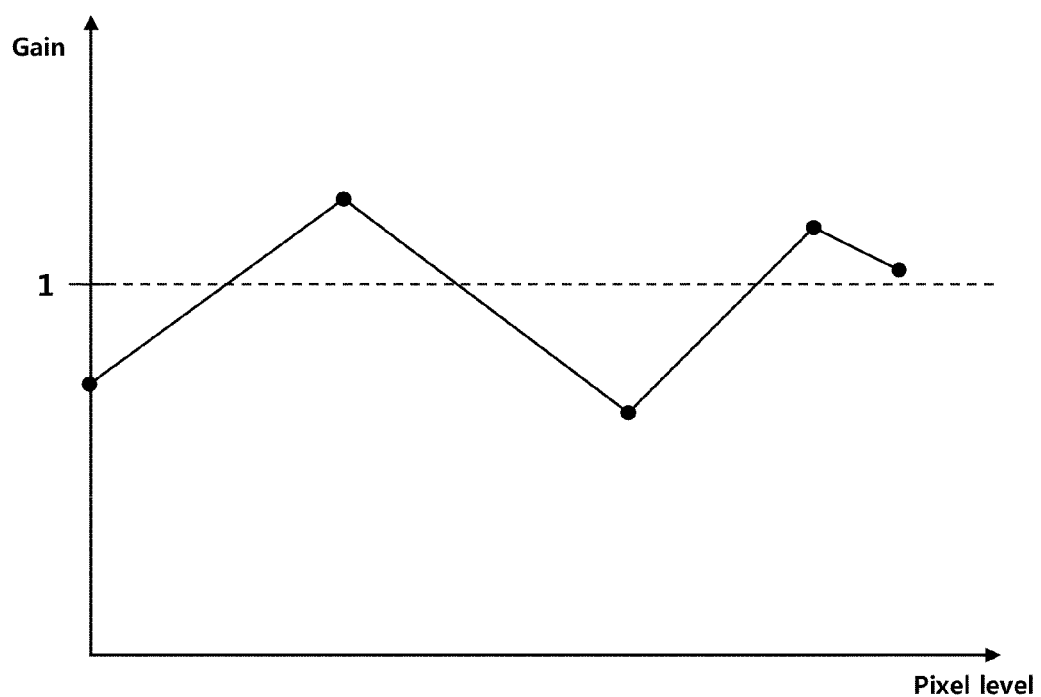
FIG. 5 is a diagram illustrating an example of calculating a compensation gain according to an embodiment.

FIG. 5 is a diagram illustrating an example of calculating a compensation gain according to an embodiment.

Referring to FIG. 5, an example in which a gain compensation circuit of an image data processing device calculates compensation gains by reflecting the fact that the ratio of a rate of change in the brightness to a rate of change in a dimming value differs depending on a pixel level is illustrated.

The gain compensation circuit may configure several points (e.g., several points among the pixel levels) by reflecting the actual characteristics as shown by the graphs in FIG. 4, and may interpolate the same, thereby calculating compensation gains. That is, the gain compensation circuit may obtain compensation gains for some pixel levels, and may interpolate the compensation gains for some pixel levels, thereby calculating the compensation gains for the remaining pixel levels.

The gain compensation circuit may use a look-up table for all pixel levels in order to calculate an accurate compensation gain.

Figure 6:
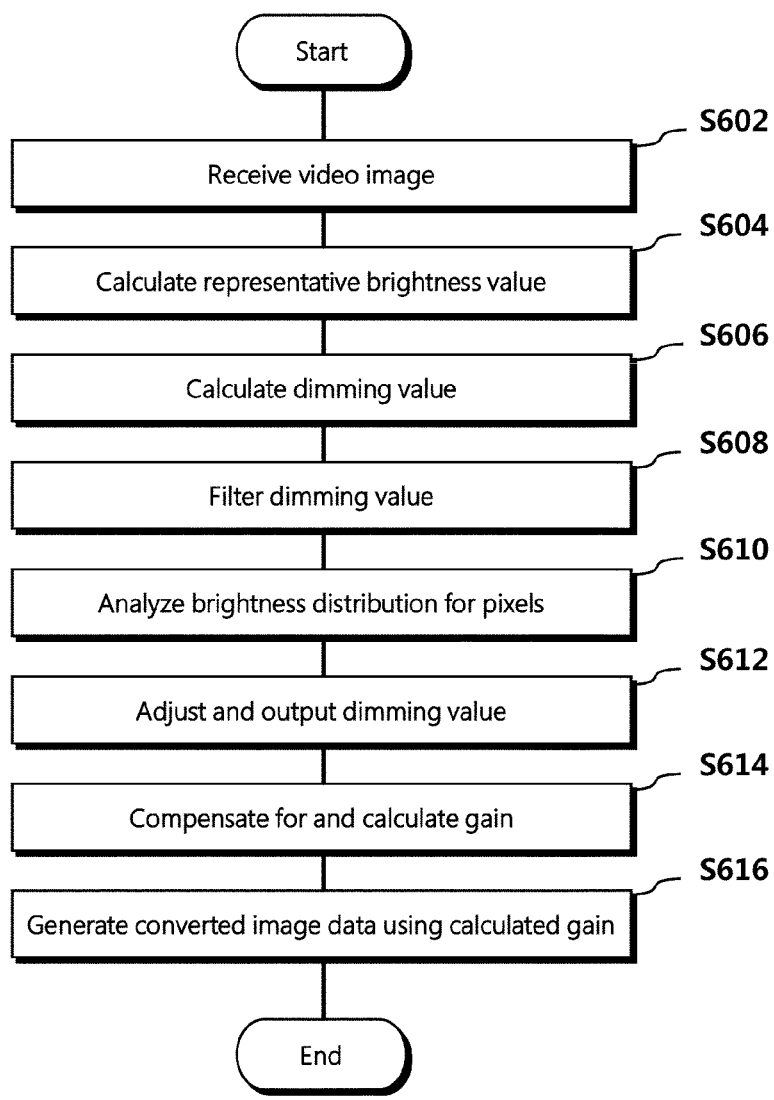
FIG. 6 is a flowchart of the operation of an image data processing device according to an embodiment.

FIG. 6 is a flowchart illustrating a local dimming operation of an image data processing device according to an embodiment.

Referring to FIG. 6, the image data processing device may receive a video image including a plurality of regions including a plurality of pixels (step S602).

The image data processing device may analyze original image data on the video image, and may calculate a representative brightness value for each region (step S604).

The image data processing device may calculate a dimming value for each region in order to adjust the brightness of the backlight according to the representative brightness value (step S606).

The image data processing device may filter the dimming value (step S608). The image data processing device may increase the dimming value such that the difference of the dimming value is reduced through filtering.

The image data processing device may analyze brightness distribution of pixels for each region (step S610).

The image data processing device may adjust the dimming value, and may output the adjusted dimming value (step S612). The image data processing device may output a dimming control signal to the backlight driving device according to the adjusted dimming value. The image data processing device may reduce the dimming value for one region in order to lower the brightness of the backlight for the one region having a low brightness distribution.

The image data processing device may calculate a gain (step S614). The image data processing device may calculate a gain by reflecting the fact that the ratio of a rate of change in the brightness of a pixel to a rate of change in a dimming value differs depending on a pixel level.

The image data processing device may generate image data converted from the original image data using the calculated gain (step S616).

What is claimed is:

1. A method for processing image data, the method comprising:
    analyzing original image data on a video image divided into a plurality of regions to calculate a representative brightness value for each of the plurality of regions;
    calculating a dimming value for each of the plurality of regions in order to adjust a brightness of a backlight according to the representative brightness value;
    adjusting the dimming value through spatial filtering such that a difference in the dimming value between the of the plurality of regions is reduced;
    analyzing brightness distribution for a plurality of pixels in each of the plurality of regions;
    re-adjusting the dimming value for one region of the plurality of regions according to the brightness distribution;
    calculating a gain for compensating for the original image data according to the dimming value; and
    generating image data converted from original image data for one pixel in the one region using the gain,
    wherein, in analyzing brightness distribution, brightness distribution for each region is analyzed by using cumulated density function (CDF) data for grayscale values of the plurality of pixels,
    wherein re-adjusting the dimming value is performed after adjusting the dimming value through the spatial filtering and, in re-adjusting the dimming value, a dimming value in the one region is reduced according to a degree in which the grayscale values indicate low brightness in the brightness distribution in order to decrease the brightness of the backlight for the one region.

2. The method of claim 1, further comprising adjusting the dimming value through temporal filtering such that a difference in the dimming value between frames is reduced.

3. The method of claim 1, wherein, adjusting the dimming value through spatial filtering comprises, if there is a difference in the dimming value between two regions, a dimming value in the region having a lower dimming value is increased so as to reduce the difference between the two regions.

4. An image data processing device comprising:
    an image analyzing circuit configured to analyze original image data on a video image divided into a plurality of regions and calculate a representative brightness value for each of the plurality of regions;

a dimming value calculating circuit configured to calculate a dimming value for each of the plurality of regions in order to adjust a brightness of a backlight according to the representative brightness value;

a pixel analyzing circuit configured to analyze brightness distribution for a plurality of pixels in each of the plurality of regions;

a dimming control circuit configured to re-adjust the dimming value for one region of the plurality of regions according to the brightness distribution; and a dimming output circuit configured to output, to a backlight driving device, a dimming control signal for driving the backlight according to the dimming value, wherein the pixel analyzing circuit analyzes the brightness distribution in the one region by using cumulated density function (CDF) data for grayscale values of a plurality of pixels in the one region, and wherein the dimming control circuit adjusts an amount of reduction in a dimming value in the one region according to a degree in which the grayscale values indicate low brightness in the brightness distribution.

5. The image data processing device of claim 4, further comprising:

a gain calculating circuit configured to calculate a gain for compensating for the original image data according to the dimming value; and a data converting circuit configured to generate image data converted from original image data for one pixel in the one region using the gain.

6. The image data processing device of claim 5, further comprising a gain compensation circuit configured to calculate a first compensation gain for compensating for a difference of a rate of reduction in the brightness of the one pixel with respect to a rate of reduction in the dimming value due to the re-adjustment by the dimming control circuit.

7. The image data processing device of claim 6, wherein the difference and the first compensation gain vary depending on a pixel level including a grayscale value of the original image data.

8. The image data processing device of claim 7, wherein the gain compensation circuit uses a look-up table (LUT) including pixel levels and first compensation gains corresponding to the pixel levels.

9. The image data processing device of claim 8, wherein the gain compensation circuit calculates the first compensation gains for some of the pixel levels, and interpolates the first compensation gains for some of the pixel levels to calculate first compensation gains for remaining pixel levels.

10. The image data processing device of claim 6, wherein the gain compensation circuit calculates a second compensation gain for compensating for a difference in brightness depending on a position of the one pixel or the backlight.

11. The image data processing device of claim 10, wherein the data converting circuit generates the converted image data using a gain reflecting the first compensation gain or the second compensation gain.

12. The image data processing device of claim 4, further comprising a filtering circuit configured to adjust the dimming value through filtering such that a difference in the dimming value between the plurality of regions and a difference in the dimming value between frames are reduced.

* * * * *